US008116758B2

(12) United States Patent
Mlinarsky et al.

(10) Patent No.: US 8,116,758 B2
(45) Date of Patent: Feb. 14, 2012

(54) SIMULATING TIME-VARYING CONDITIONS IN A WIRELESS NETWORK

(75) Inventors: Fanny I. Mlinarsky, Bolton, MA (US);
John E. Ziegler, Westborough, MA (US); Raymond Cronin, North Easton, MA (US); Jeremy Spilman, Shirley, MA (US)

(73) Assignee: AZIMUTH Systems, Inc., Acton, MA (US)

( * ) Notice: Subject to any disclaimer, the term of this patent is extended or adjusted under 35 U.S.C. 154(b) by 181 days.

(21) Appl. No.: 12/501,852

(22) Filed: Jul. 13, 2009

(65) Prior Publication Data
US 2010/0172244 A1 Jul. 8, 2010

Related U.S. Application Data

(63) Continuation of application No. 11/111,193, filed on Apr. 21, 2005, now abandoned.

(51) Int. Cl.
*H04W 24/00* (2009.01)
(52) U.S. Cl. ........................ 455/423; 455/67.11; 370/241
(58) Field of Classification Search .................. 370/241, 370/328, 338; 455/432.1, 423–425, 67.11–67.16
See application file for complete search history.

(56) References Cited

U.S. PATENT DOCUMENTS

| | | | | |
|---|---|---|---|---|
| 5,023,900 A | * | 6/1991 | Tayloe et al. | 379/32.01 |
| 5,570,373 A | * | 10/1996 | Wing | 455/423 |
| 5,764,726 A | * | 6/1998 | Selig et al. | 379/21 |
| 5,828,962 A | * | 10/1998 | Ho-A-Chuck | 455/446 |
| 5,987,320 A | * | 11/1999 | Bobick | 455/423 |
| 6,272,337 B1 | * | 8/2001 | Mount et al. | 455/423 |
| 6,587,671 B1 | * | 7/2003 | Kanago et al. | 455/67.11 |
| 6,662,009 B2 | * | 12/2003 | Lynn | 455/424 |
| 6,724,730 B1 | * | 4/2004 | Mlinarsky et al. | 370/241 |
| 7,539,489 B1 | * | 5/2009 | Alexander | 455/423 |
| 7,561,878 B2 | * | 7/2009 | Tam et al. | 455/425 |
| 7,889,663 B1 | * | 2/2011 | Wright et al. | 370/241 |
| 2005/0053008 A1 | * | 3/2005 | Griesing et al. | 370/241 |

* cited by examiner

*Primary Examiner* — Sharad Rampuria
(74) *Attorney, Agent, or Firm* — Anderson Gorecki & Manaras LLP

(57) ABSTRACT

Time-varying conditions in a wireless network are simulated using an architecture that includes an enclosure for shielding a wireless device under test ("DUT") from electro-magnetic interference, including other wireless devices; and at least one of: (1) a communications traffic generating device operable to generate communications traffic having selected characteristics; and (2) at least one dynamically adjustable attenuator in communication with the wireless device and the traffic generator. Embodiments of the architecture include wireless test equipment for testing operating range, roaming and capacity. The attenuator is used to adjustably attenuate signals between the device and the traffic generator over time during a test, whereby motion of the device is simulated. By connecting multiple access points, each associated with a dynamically adjustable attenuator, it is possible to force the DUT to roam between access points. The communications traffic generating device can be used to vary traffic over time during a test in order to test capacity, prioritization and admission control. For example, the communications traffic generator may include phone and data client emulators which simulate different traffic types that can be independently varied over time during a test.

43 Claims, 15 Drawing Sheets

SIMULATING TIME-VARYING CONDITIONS IN A WIRELESS NETWORK

CROSS REFERENCE TO RELATED APPLICATION

The application is a Continuation of U.S. patent application Ser. No. 11/111,193, entitled, SIMULATING TIME-VARYING CONDITIONS IN A WIRELESS NETWORK filed Apr. 21, 2005 now abandoned, which is incorporated by reference.

FIELD OF THE INVENTION

This invention relates generally to the field of test equipment, and more particularly to testing responses to time-varying conditions in a wireless network.

BACKGROUND OF THE INVENTION

New wireless technology is being developed and deployed to provide support for voice and multimedia services in both residential and enterprise environments. Wireless Local Area Network ("WLAN") devices, for example, are being developed in conjunction with IEEE 802.11 standards to support packetized voice communications such as Voice over Internet Protocol ("VoIP"). There are technological hurdles that must be overcome in order to support voice and multimedia on WLANs because the technology was initially designed to support simple data communications. In particular, voice and multimedia applications can be more sensitive to jitter, delay and packet loss than data communications applications. IEEE 802.11 specifies protocols and techniques for overcoming some of these technological hurdles.

Because the costs associated with developing, purchasing, selling and deploying a new wireless technology are often quite high, it is common to conduct testing to mitigate the risk that the technology will fail to perform as planned. However, wireless devices are notoriously difficult to test because they can be affected by ambient sources of interference. Further, the different combinations of conditions to which a wireless device may be subjected in actual use is so great in number that it is difficult and time-consuming to create all of those conditions in a test environment. It is known, for example, to simulate some wireless network operations by manually moving a wireless device through a building in which wireless access devices are strategically situated. However, this technique is too labor intensive and imprecise to simulate a wide variety of traffic conditions, distances between access points and rates of motion in a practical manner. Further, such a manual, open-air test can be rendered invalid by transient interference from a microwave, RADAR or other RF source. More recently it has become known to simulate a wireless network by enclosing devices in EMI-shielded containers which are in communication via wired connections. Attenuators and combiners are employed to simulate a selected distance between devices. Such a system is disclosed in U.S. Pat. No. 6,724,730, which is incorporated herein by reference.

SUMMARY OF THE INVENTION

In accordance with the invention, technology for simulating time-varying conditions in a wireless network includes an enclosure for shielding a wireless device under test ("DUT") from electro-magnetic interference; a communications traffic generator operable to generate communications test traffic having selected characteristics; and a dynamically adjustable attenuator in communication with the wireless device and the traffic generator, the attenuator being operable to adjustably attenuate signals between the device and the traffic generator over time during a test, whereby motion of the device is simulated. By connecting multiple access points, at least one of which is in communication with a separate dynamically adjustable attenuator, it is possible to force the DUT to roam between access points. Further, phone and data client emulators can be employed to simulate support of variable numbers of client devices which can be changed during a test, including individual motions of those devices.

One advantage of the invention is the ability to simulate motion in order to test range. Manually testing response to motion in open-air is time consuming and inaccurate. Further, static tests carried out at a series of distances can be automated, but fail to account for the effects of rate of motion. Hence, the present invention offers the efficiency and accuracy of an automated test and also simulates selectable rates of motion.

Another advantage of the invention is the ability to use simulated motion to cause and test roaming. Roaming time is a significant metric to voice communications because each time a phone roams it is subjected to a burst of lost packets. In general, bursty packet loss has a more deleterious effect on voice quality than uniform, distributed packet loss because CODECS are capable of correcting or regenerating limited numbers of lost packets in a given portion of a transmission. This is significant because in WiFi networks where the density of access points is relatively high roaming can occur every few seconds at normal walking velocity, potentially resulting in unacceptable performance. In order to reduce the deleterious effects of bursty packet loss caused by roaming the IEEE and the WiFi Alliance may specify a 50-msec limit on roaming time. To meet the 50-mSec roaming time requirement, the IEEE is developing a new standard, 802.11r, which will define a fast roaming algorithm. 802.11r in turn relies on another new standard, 802.11k, which helps the phone discover neighboring access points and query their status in preparation for a fast roam. 802.11r also relies on the security standard, 802.11i, to support pre-authentication so that the lengthy authentication process can be avoided during a fast roam. The present invention provides an efficient, accurate and automated technology for testing both equipment and communications protocols.

Yet another advantage of the invention is the ability to simulate a load of both data and voice clients, and to change the number of clients during a test in order to test capacity, e.g., access point capacity. One aspect of the protocols developed to support voice communications on WLANs is implementation of Quality of Service ("QoS") controls. QoS controls include admission control protocols to limit the number of simultaneous calls though a single access point, and priority protocols to process packets according to assigned levels of priority. For example, an admission control protocol may prevent admittance of a new voice or data client if there is insufficient bandwidth to support that new client. Similarly, in the case of packet forwarding and drop decisions preference may be given to voice packets because voice applications tend to be more susceptible to packet loss, delay and jitter. By simulating selectable numbers of voice and data clients, and changing the number of clients during a test, the invention advantageously facilitates testing such protocols and the devices in which the protocols are implemented.

Another advantage of the invention is the ability to combine real and emulated devices, and also to emulate motion and to monitor the behavior of devices under test at the same time. For example, a single real device can be tested under controlled conditions using an emulated device. Alternatively, interactions between multiple real devices may be tested under controlled conditions while observing interactions of the devices in the absence of an emulated device.

DETAILED DESCRIPTION

A Device Under Test ("DUT") can be any sort of device, without limitation, including but not limited to an access point, a client, multiple access points, multiple clients, and any combinations thereof.

Figure 1A:
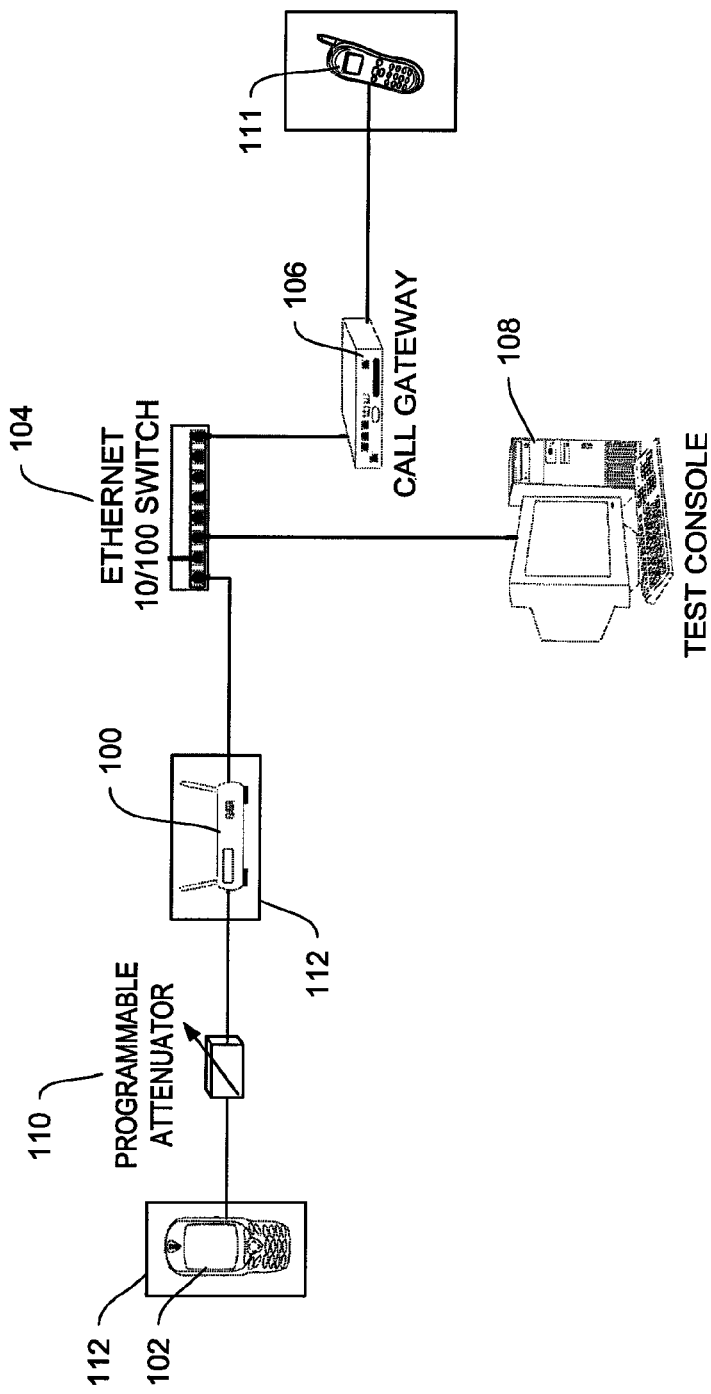
FIG. 1A illustrates an architecture for simulating changes in distance between an access point and a wireless device under test, which can be used for testing operating range.

FIG. 1A illustrates an architecture for simulating changes in distance between an access point (100) and a wireless DUT (102) such as a phone, PDA or personal computer. A switch (104) such as a 10/100 Ethernet switch is connected between the access point and a call gateway (106). A test console (108), which is connected to the switch, may be employed to control the test in whole or in part. In particular, the test console may control a dynamically adjustable and programmable attenuator (110) which is connected between the access point and the DUT. In order to establish communication and generate traffic a call is initiated through the call gateway to the DUT, e.g., with phone (111). An audio input may be used to produce bi-directional traffic that is not simply indicative of silence. The test console and specialized monitoring test modules monitor traffic between the call gateway and the DUT on the 802.11 and on the 802.3 interfaces. The wireless devices, i.e., the DUT and the access point, are enclosed in housings (112) which shield against EMI and also isolate devices in the test bed from one another. The wireless devices are isolated by at least 110 dB in the entire frequency range of operation in order to substantially eliminate any signal paths other than through the intended cables, attenuators, combiners and switches in the test systems. Connectivity between the wireless devices and other elements of the architecture is non-wireless, e.g., electrical or optical.

Changes in distance between the access point (100) and the device (102) under test are simulated by changing the path loss between the access point and DUT. In particular, the path loss is changed during a test. Received signal strength relative to transmitted signal strength, i.e., path loss, is a reasonably accurate indicator of distance between wireless devices in the absence of shielding structures and interference. The dynamically adjustable attenuator (110) is operable in response to signaling from the test console (108) to attenuate signals between the DUT and the access point in a preprogrammed manner. In other words, an operator may design a test regimen using the test console which causes the attenuator (110) to increase and decrease path loss to selectable magnitudes and at selectable rates of change over time in accordance with a predetermined schedule to simulate various changes in distance, i.e., motion.

Referring now to FIGS. 1A through 1E, changes in operation of the device (102) under test in response to simulated changes in distance are monitored. Any measurable characteristics of the communications generated by the DUT may be monitored and stored, but in the illustrated embodiment the test console and monitoring devices together monitor and store communications characteristics including jitter, packet loss and delay which can be used to generate an indication of communications quality versus path loss. Various indicators of communications quality are known. In the case of voice communications, the communications quality may be expressed in terms including but not limited to Mean Opinion Score ("MOS"), Perceptual Speech Quality ("PESQ"), and Rating Factor ("R-Factor"), each of which is known in the art. R-Factor, for example, is computed as a function of delay, packet loss and other parameters such as noise, echo and path loss, which would be monitored and stored. Those skilled in the art will recognize that the invention may be modified to provide any measurable or calculable quality metrics.

Figure 1B:
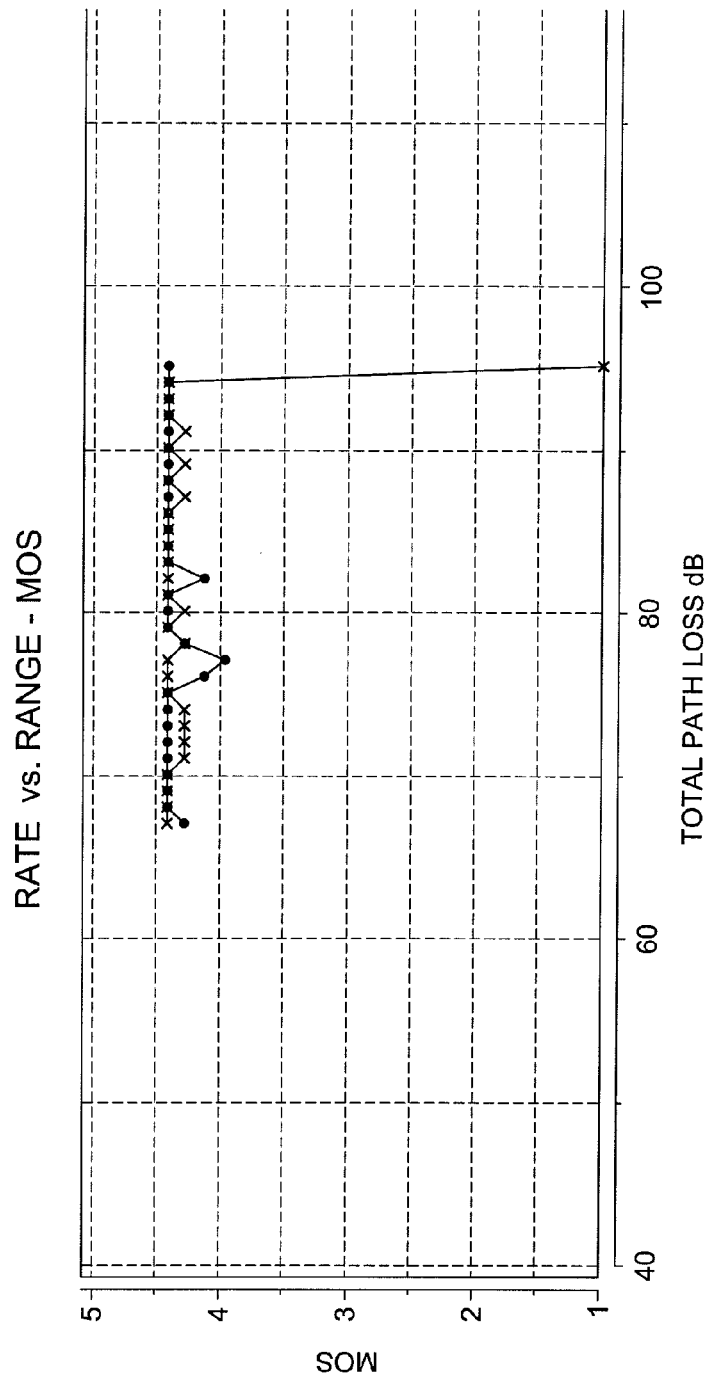
FIG. 1B illustrates test results obtained from the architecture of FIG. 1A, plotted in terms of voice quality versus path loss.
Figure 1C:
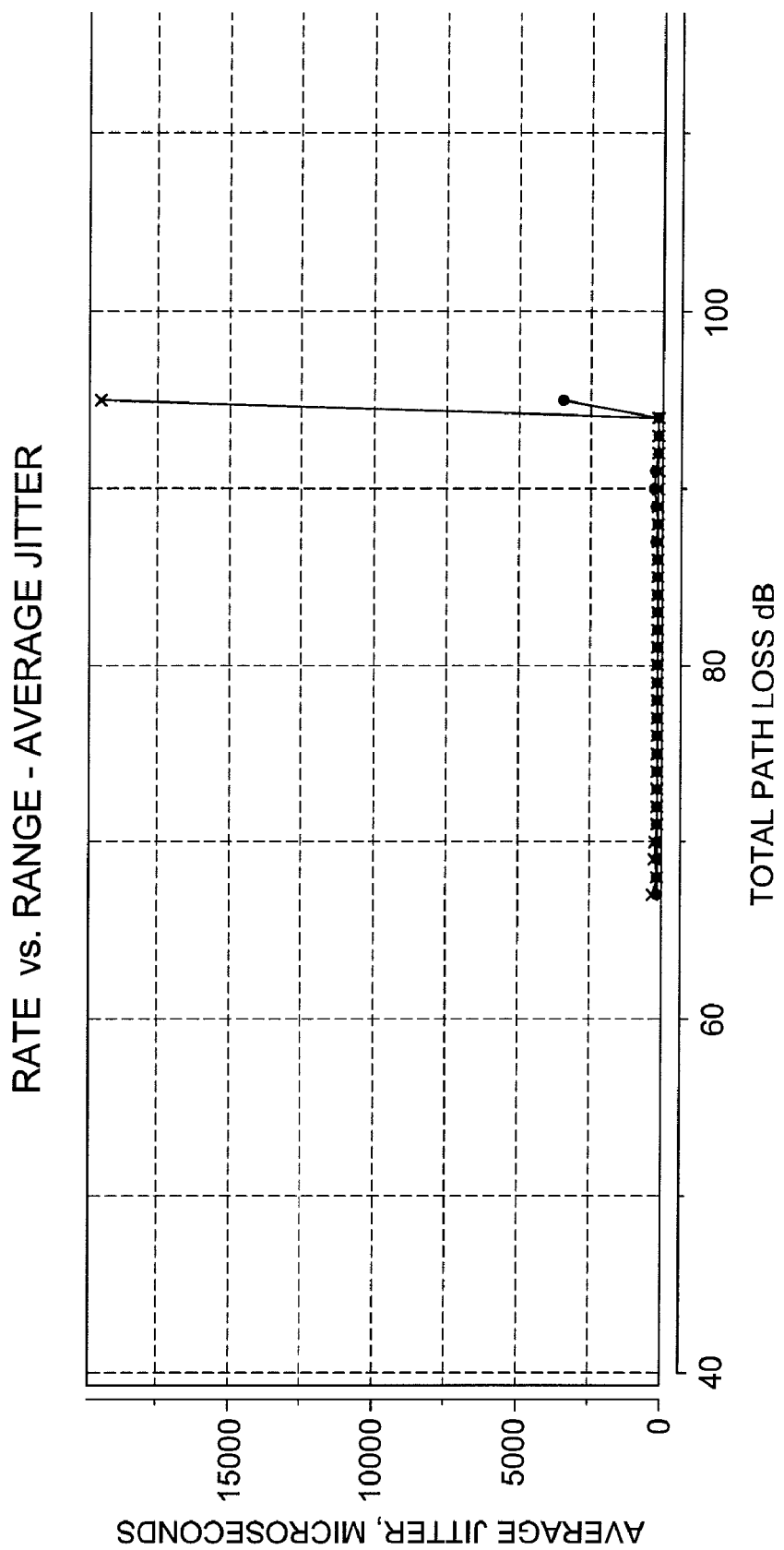
FIG. 1C illustrates test results obtained from the architecture of FIG. 1A, plotted in terms of average jitter versus path loss.
Figure 1D:
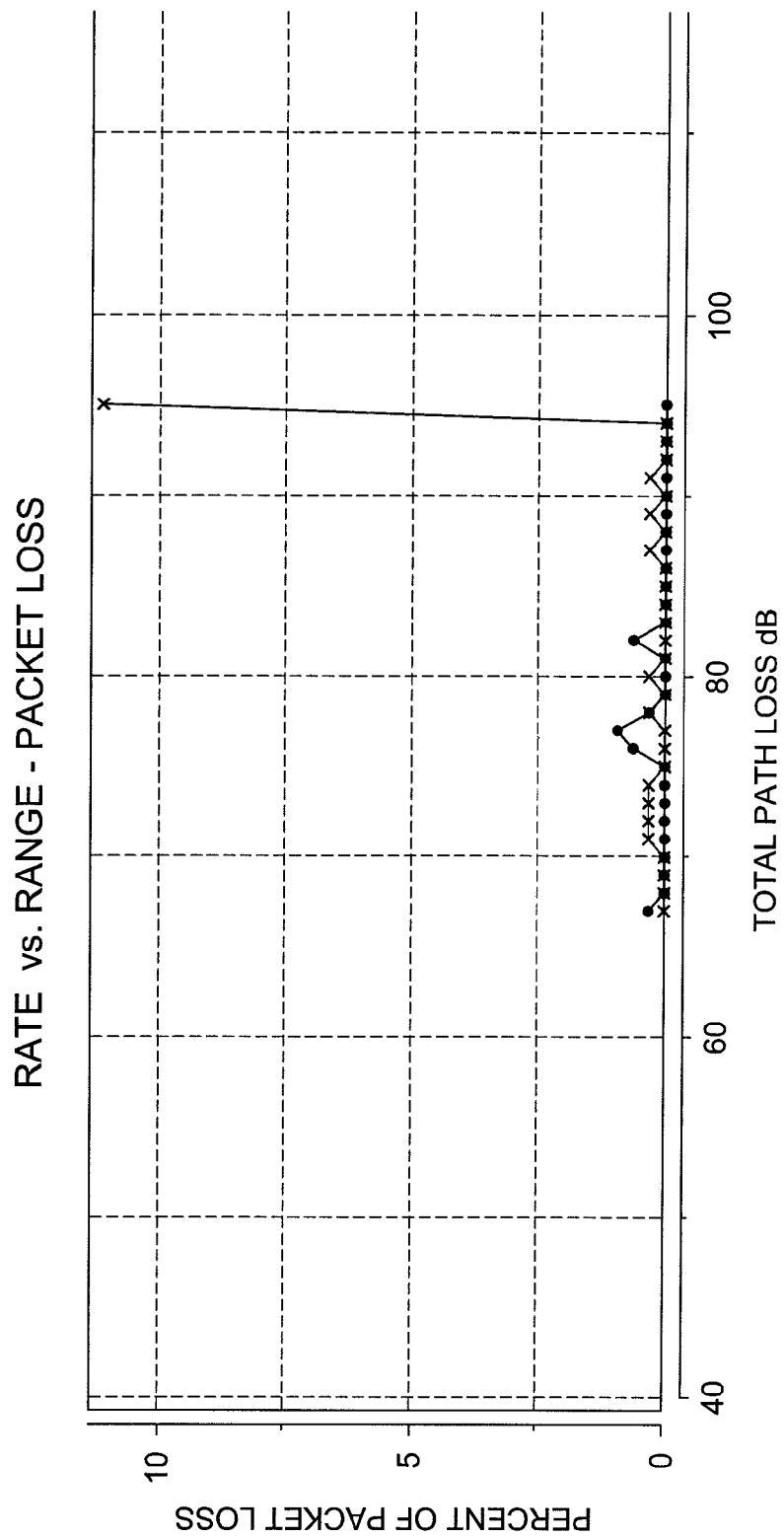
FIG. 1D illustrates test results obtained from the architecture of FIG. 1A, plotted in terms of packet loss versus path loss.
Figure 1E:
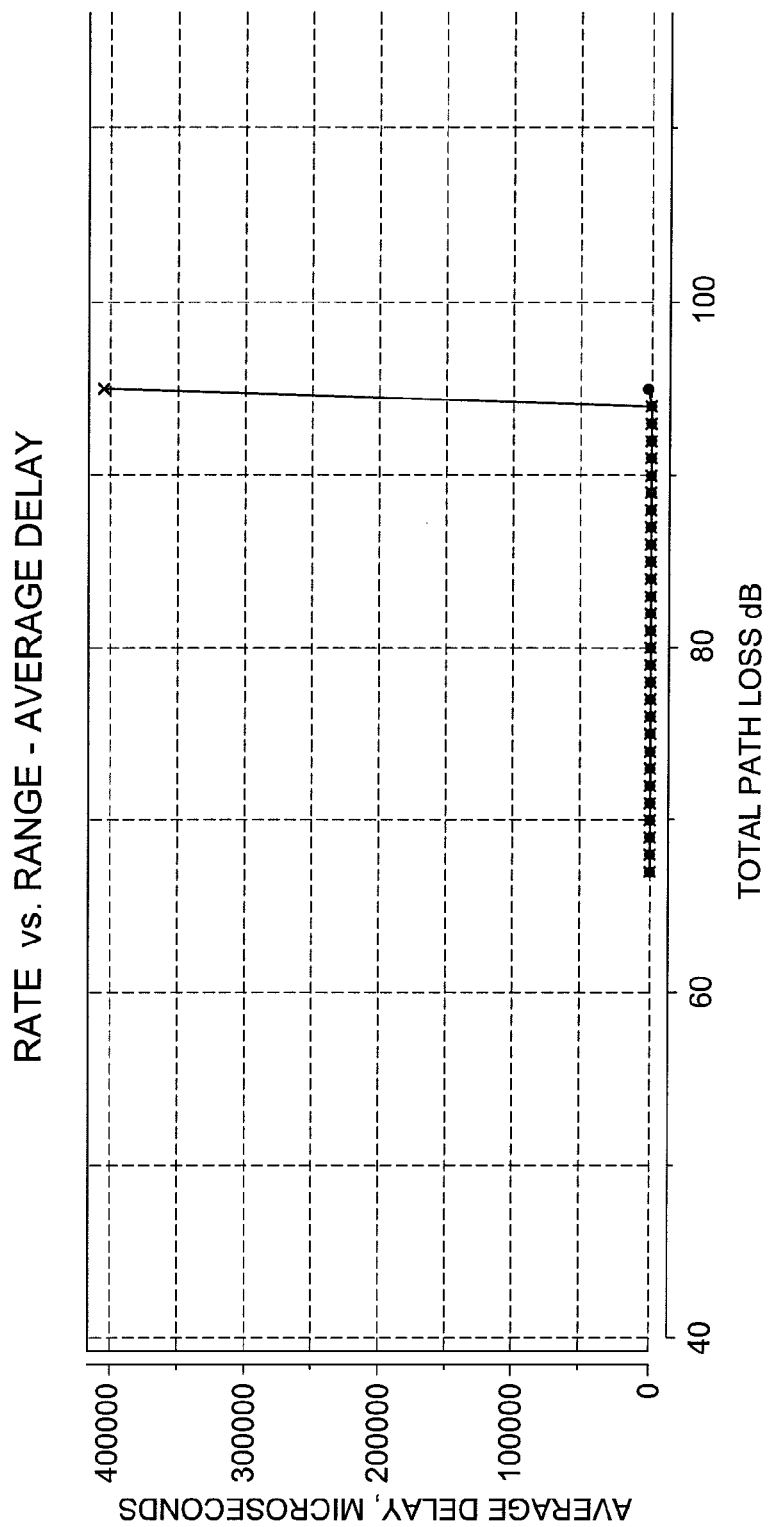
FIG. 1E illustrates test results obtained from the architecture of FIG. 1A, plotted in terms of average delay versus path loss.

FIG. 1B illustrates voice quality expressed in terms of MOS versus path loss as a result of testing a wireless phone with the architecture of FIG. 1A. MOS, which is a subjective standard with scoring from 1 to 5 that can be produced using people listening to sound, can also be approximated using R-Factor as specified in ITU-T G.107. The illustrated data indicates that voice quality in terms of MOS for a VoIP phone operating over a WLAN may degrade rapidly at a given distance from the access point at which path loss is approximately 78 dB. It should be noted that the response of a device to dynamically changing distance, i.e., motion, may differ from responses to static tests at those same distances. Static tests can simulate performance of the device at a series of different distances from the access point, but do not simulate different rates of change in distance which may effect performance of the DUT. This could be significant if, for example, particular phones or the protocols which support voice communications on the WLAN are sensitive to particularly rapid or slow changes in distance between the phone and access point.

Figure 2A:
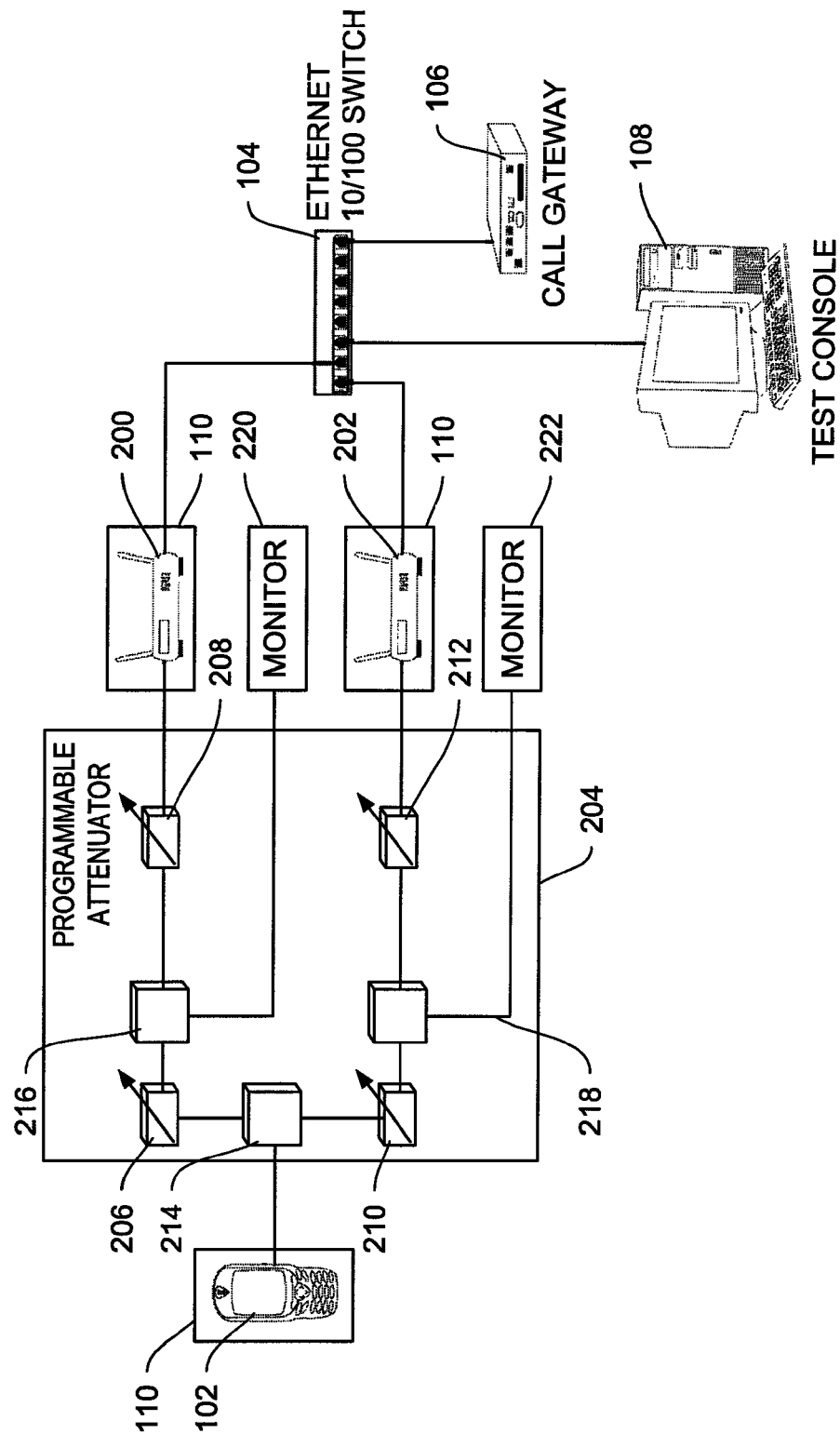
FIG. 2A illustrates an architecture for simulating roaming of a wireless device under test between access points.

FIG. 2A illustrates an architecture for simulating roaming of a wireless device (102) between access points (200, 202). In this architecture a dynamically adjustable attenuator matrix (204) is connected between two access points (200, 202) and the device (102) under test. The attenuator matrix (204) includes four dynamically adjustable and programmable attenuators (206, 208, 210, 212) and a combiner (214). One pair of attenuators, i.e., (206 and 208) or (210 and 212), is connected in series between each access point and the device. Taps (216, 218) are employed to enable connection of monitors (220, 222).

Operation of the device (102) when in range of both access points (200, 202) can be observed by setting the attenuators (206, 208, 210, 212) such that the device (102) is capable of communications with either access point. This might be desirable, for example, to observe initial association selections as a function of relative signal strength. By connecting the taps in the illustrated manner the monitors can also monitor traffic, e.g., signals or packets, from the DUT (102) and the access points (200, 202) even when the DUT and access points are not in communication, e.g., because of attenuator settings. Further, the device can be placed in a condition which is likely to trigger a roam from one access point to another by attenuating the signal of the currently associated access point and at the same time amplifying the signal between the DUT and another access point.

Figure 2B:
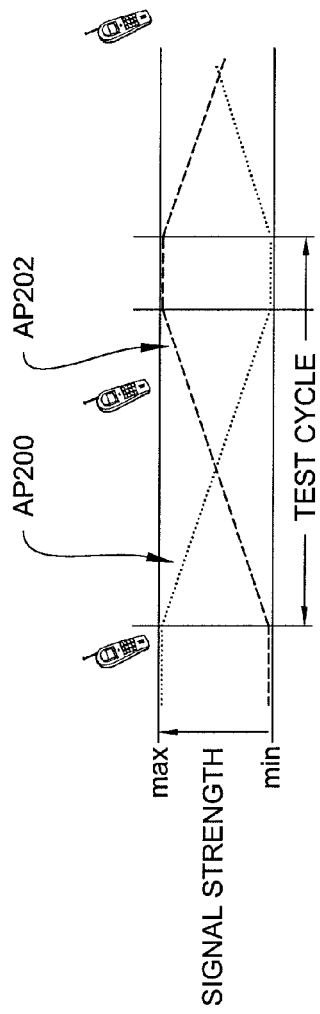
FIG. 2B illustrates signal strength over a test cycle associated with the architecture of FIG. 2A.
Figure 2C:
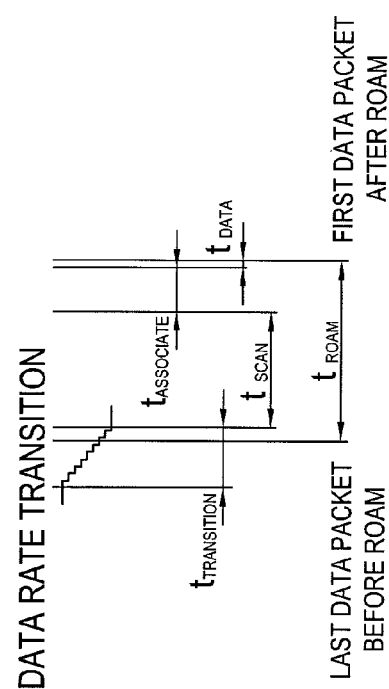
FIG. 2C is a timing diagram of communications and protocols over a test cycle associated with the architecture of FIG. 2A.

Referring now to FIGS. 2A, 2B and 2C, the dynamically adjustable attenuators are controlled in a manner which simultaneously changes the signal strength between both access points (200, 202) and the DUT (102) in order to simulate motion and trigger roaming. The example illustrated in FIG. 2B shows the signal from the first access point (200) being reduced at the same rate as the signal from the second access point (202) increases. This scenario simulates movement from the first access point to the second access point. At some point the device (102) under test disassociates from the first access point and associates with the second access point. The timing of such a roaming transition, which is illustrated in detail in FIG. 2C, is a function of the specific design of the DUT and the communications protocols being utilized. For example, roaming may be prompted by actual failure of communications between the device (102) and access point (200), by an anticipation of imminent failure, or by a determination that an alternate access point (202) will provide better quality service. It should be noted that the relative rates of change in signal strengths may differ from the illustrated example. For example, greater rates of change would simulate faster movement between access points. Further, different rates of change in signal strength simulate movement in a path other than a line between the access points. For example, the signal strength of access point (200) might be decreased at a greater rate than the signal strength of access point (202) is increased, simulating the effect of an obstruction coming between the access point and the DUT, for example, or non-linear motion. Mathematic functions for calculating attenuation values in order to simulate motion in any desired path or paths, and at any desired rate or rates, in one, two and three-dimensional space relative to the access points are well understood by those skilled in the art.

Figure 2D:
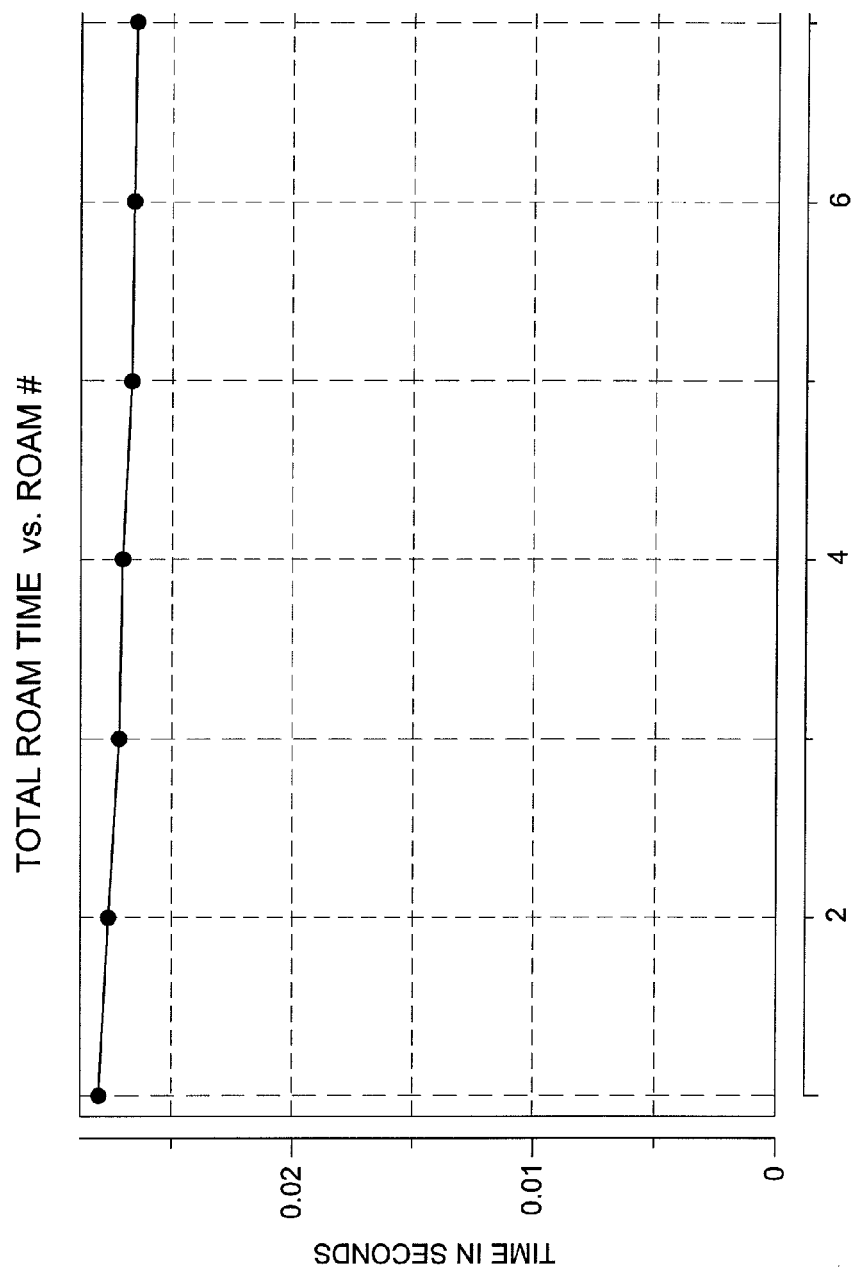
FIG. 2D illustrates test results obtained from the architecture of FIG. 2A, plotted in terms of roam time for successive roam events.
Figure 2E:
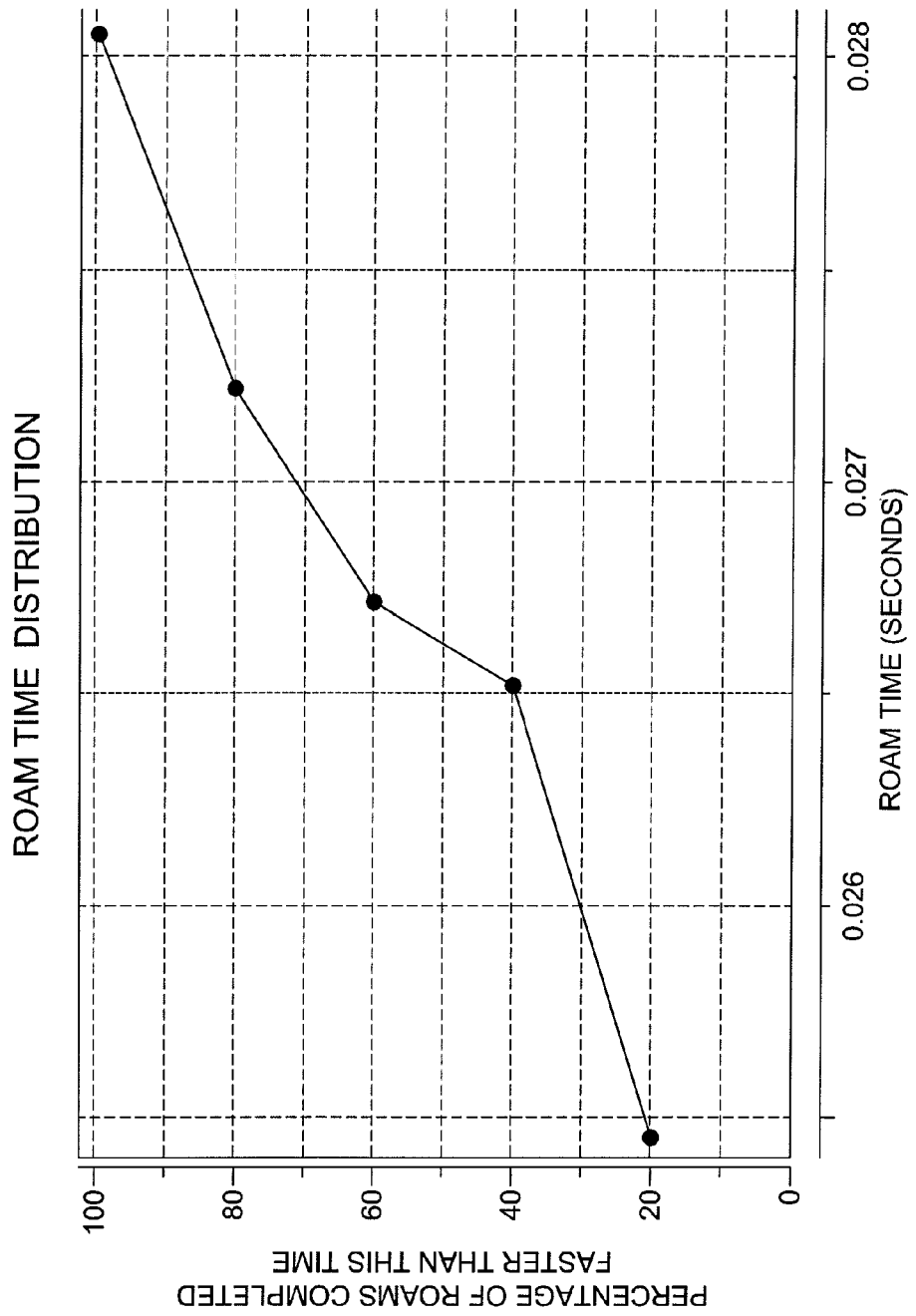
FIG. 2E illustrates roam time distribution over a test cycle associated with the architecture of FIG. 2A.

Because of the importance of roaming time to voice communications technology, data such as that illustrated in FIG. 2C may be monitored and stored. For a device (102) providing voice service, i.e., a phone, each roam event subjects the device to a burst of lost packets. In general, bursty packet loss adversely impacts voice quality more significantly than uniform packet loss because of the function of CODECS used to support voice communications. In WiFi networks where the density of access points is relatively high, e.g., every 2-3 meters, roaming can occur every few seconds at normal walking velocity. In order to reduce the adverse impact of bursty packet loss caused by roaming it is desirable to minimize roaming time. For example, the IEEE and the WiFi Alliance may specify a 50-msec limit on roaming time. To meet the 50-msec roaming time requirement, the IEEE is developing a new standard, 802.11r, which will define a fast roaming algorithm. 802.11r in turn relies on another new standard, 802.11k, which helps the phone discover the neighboring access points and query their status in preparation for a fast roam. 802.11r also relies on the security standard, 802.11i, to support pre-authentication so that the lengthy authentication process can be avoided during a fast roam. Therefore, the test console and monitoring devices may be configured to monitor, store and display test data indicative of performance relative to each of the relevant standards associated with roaming, including but not limited to the data types illustrated in FIG. 2C in which each phase of the roaming process is displayed. As access point (200) is moved out of range of the phone, the data rate of the phone transitions down ($t_{TRANSITION}$). When access point (200) is completely out of range, the phone starts to scan for another access point ($t_{SCAN}$). Eventually the phone associates with access point (202). The time used to associate with access point (202) ($t_{ASSOCIATE}$) and the time used to resume data transitions ($t_{DATA}$) are also shown. The roaming time ($t_{ROAM}$) is the time between the last data transmission prior to roam and the first data transmission following the roam. All of this data may be plotted, analyzed and exported via the test console (108). As illustrated in FIGS. 2D and 2E, test results may be plotted in terms of number of roam events completed in less than a predetermined time, and roam time distribution over a test cycle.

Figure 3A:
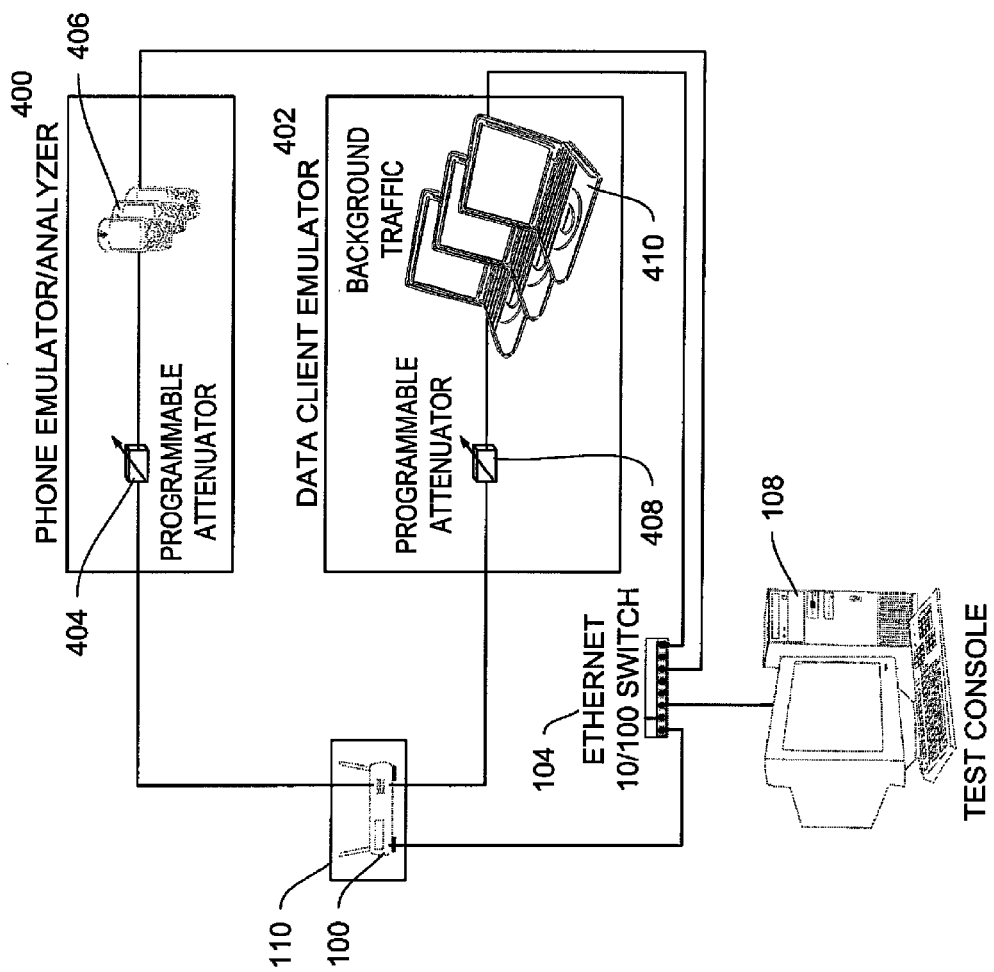
FIG. 3A illustrates an architecture for simulating changes in the amount of voice and data traffic, changes in the number of voice and data devices associated with a wireless device under test, and changes in distance between the voice and data devices and the wireless device under test.
Figure 3B:
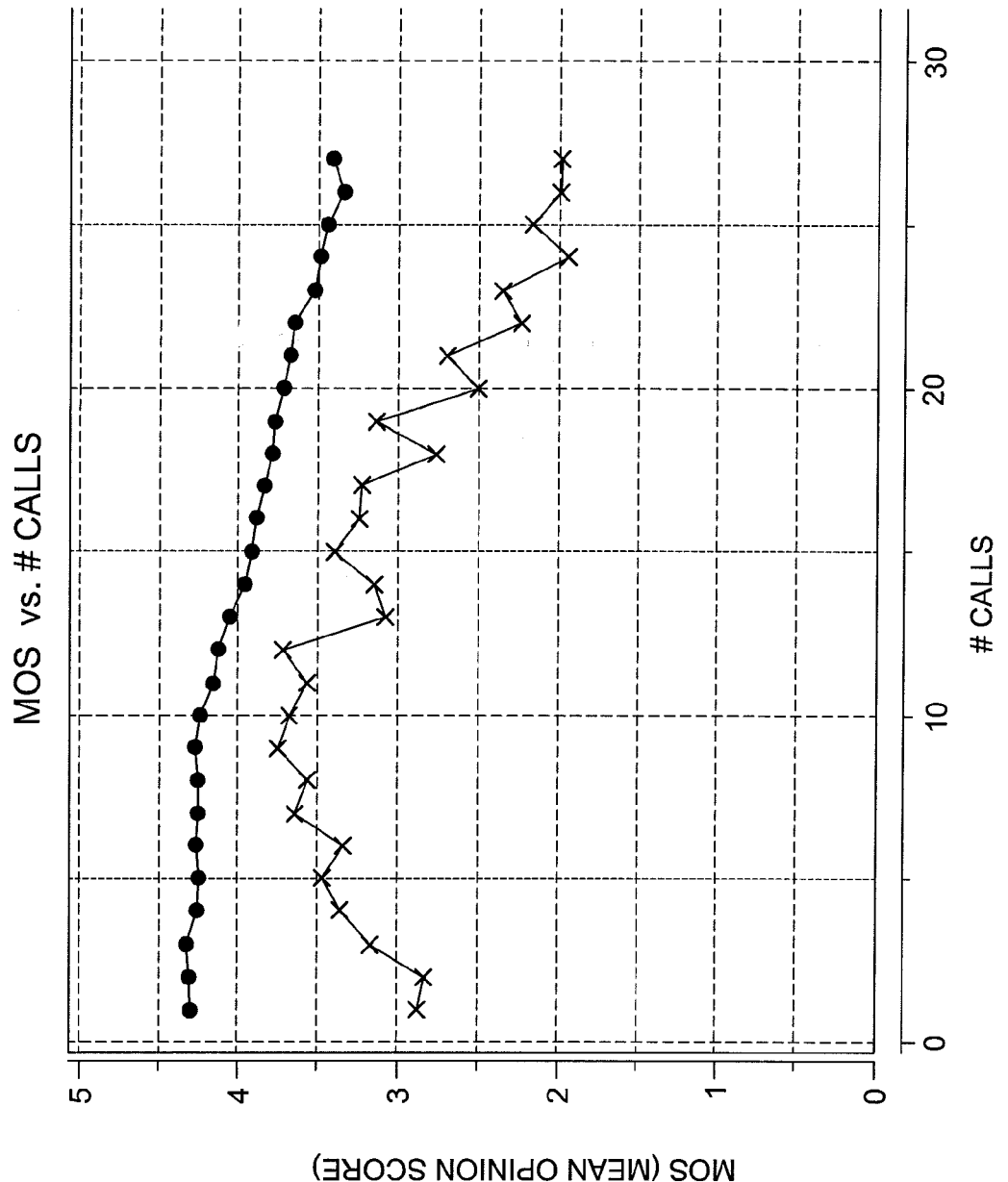
FIG. 3B illustrates voice quality in terms of MOS versus number of calls produced from the architecture of FIG. 3A.
Figure 3C:
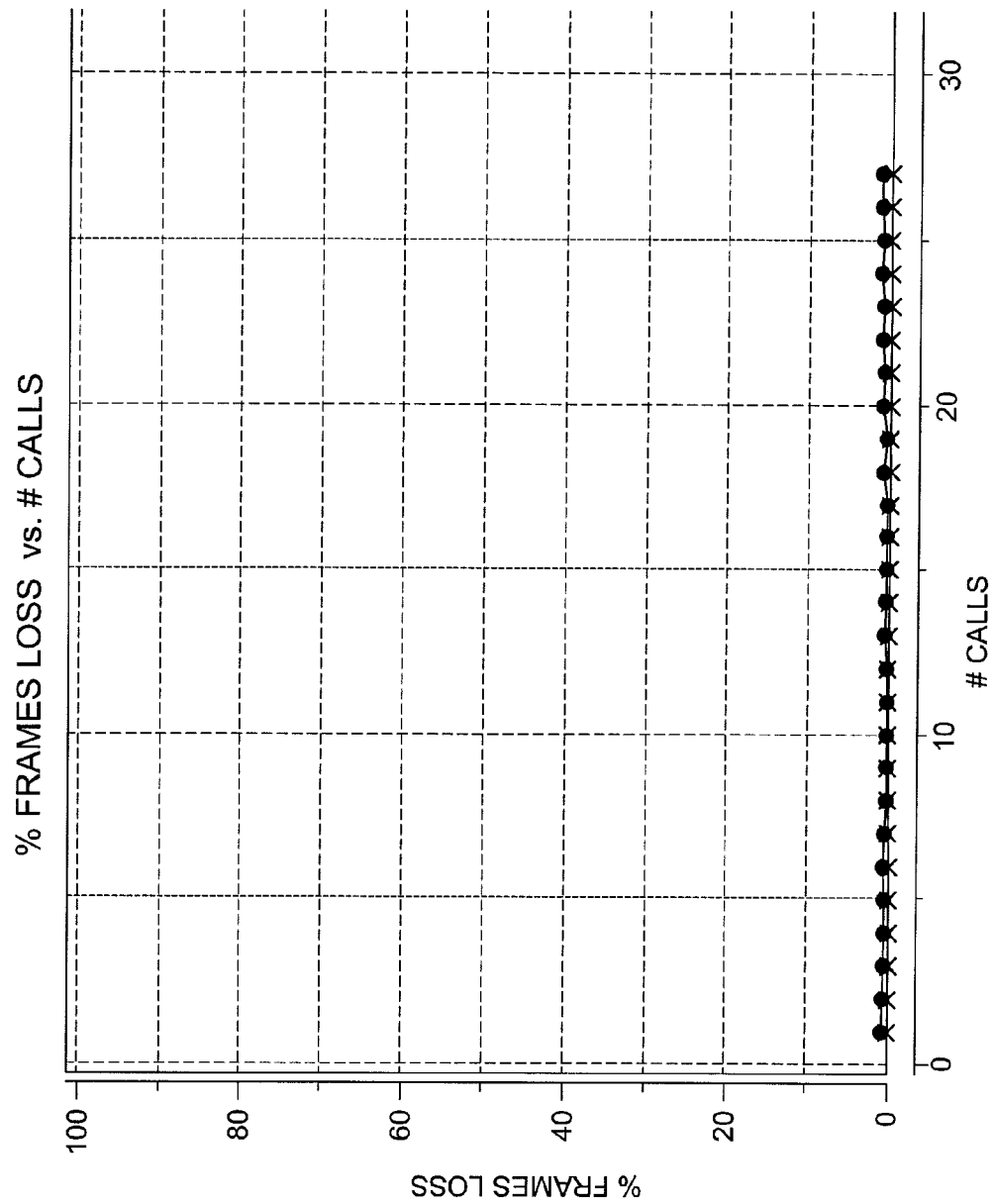
FIG. 3C illustrates % frames loss versus number of calls produced from the architecture of FIG. 3A.
Figure 3D:
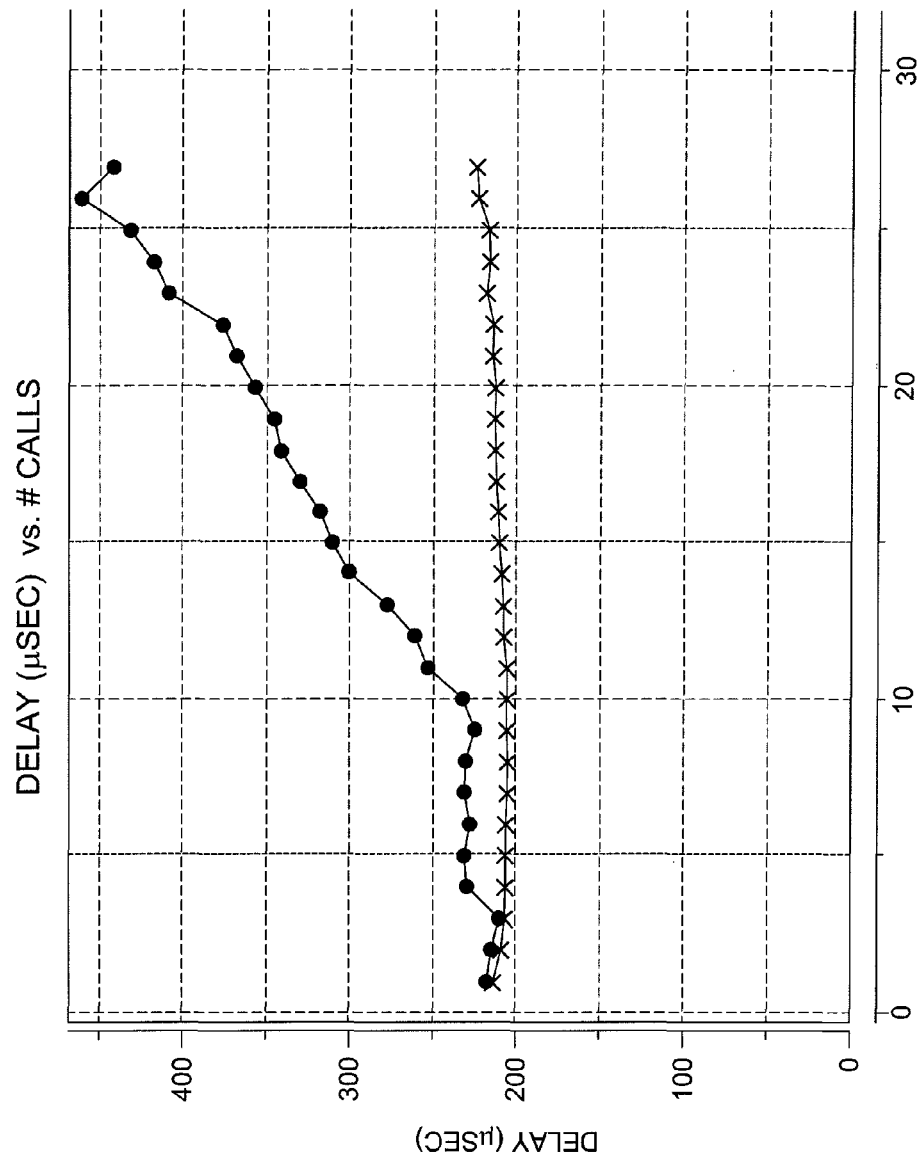
FIG. 3D illustrates delay versus number of calls produced from the architecture of FIG. 3A.
Figure 3E:
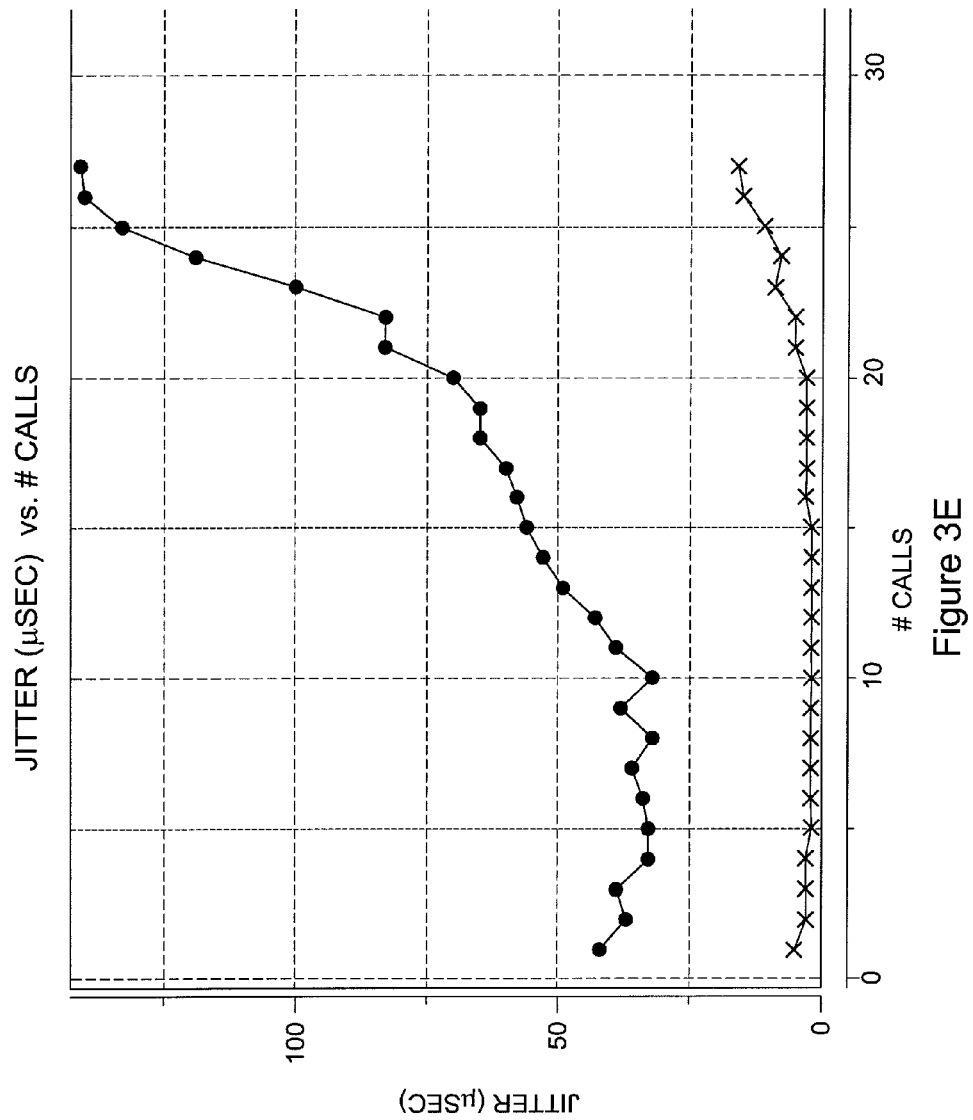
FIG. 3E illustrates jitter versus number of calls produced from the architecture of FIG. 3A.
Figure 3F:
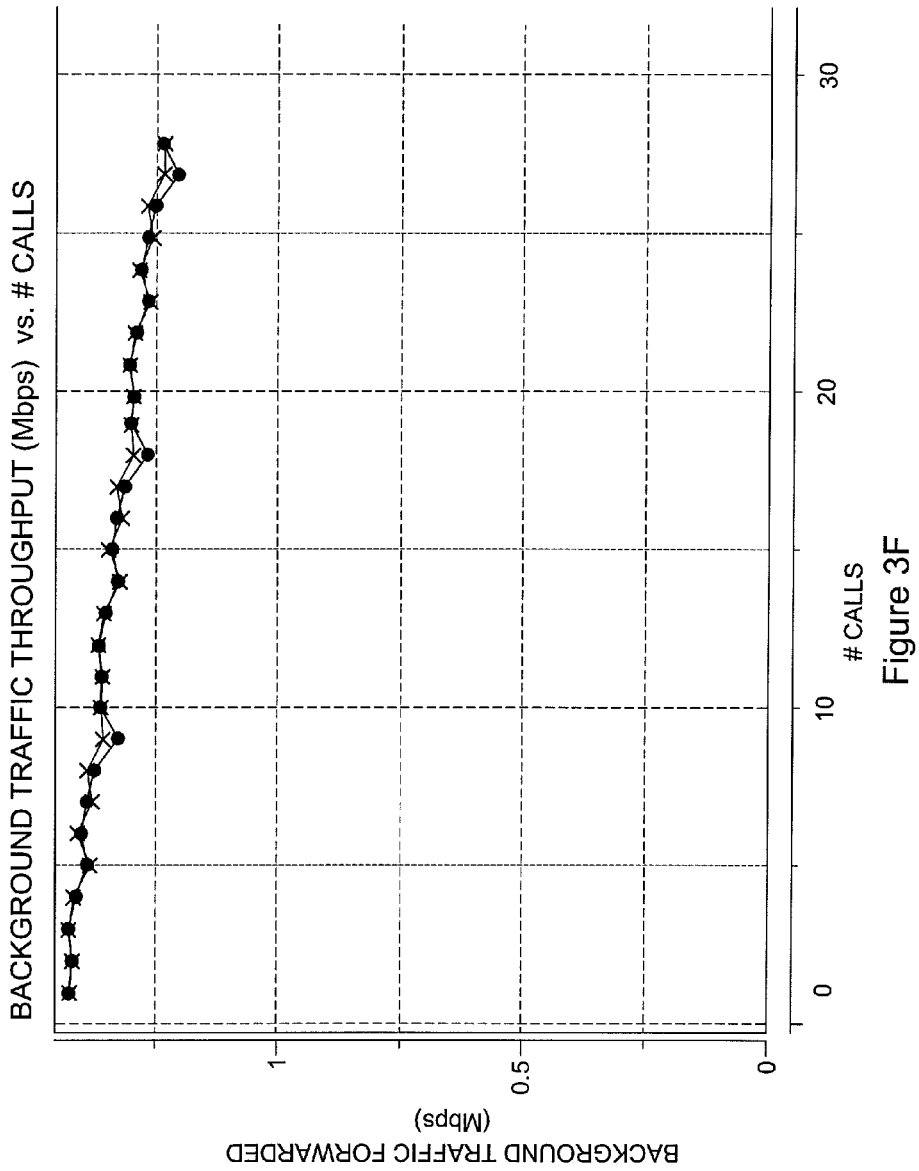
FIG. 3F illustrates background traffic throughput versus number of calls produced from the architecture of FIG. 3A.

FIG. 3A illustrates an architecture for simulating changes in the amount of voice and data traffic, changes in the number of voice and data devices associated with a wireless access point under test, and changes in distance between the voice and data devices and the wireless DUT. The architecture includes a phone emulator/analyzer (400) and a data client emulator (402) which are connected in parallel between the switch (104) and the access point (100). The phone emulator and data client emulator are each capable of simulating association and disassociation of multiple devices, and individual motions of those devices relative to the access point.

The phone emulator (400) includes a dynamically adjustable attenuator (404) and voice traffic generator (406). The voice traffic generator is capable of simulating multiple voice devices, including adding and subtracting voice devices from the simulation during a test. Further, the characteristics of traffic from each voice device may be configured and changed, e.g., to simulate periods of silence or lack of silence. The dynamically programmable attenuator is operable to individually attenuate signals from each device simulated by the voice traffic generator. Hence, the phone emulator can simulate individual movements of voice devices, as well as changing the number of devices associated with the access point.

The data client emulator (402) includes a dynamically adjustable attenuator (408) and a background traffic generator (410). The background traffic generator is capable of simulating multiple data client devices, including adding and subtracting data client devices from the simulation during a test. Further, the characteristics of traffic from each data client device may be configured and changed, e.g., to simulate bursts of data transmissions. The dynamically programmable attenuator is operable to individually attenuate signals from each data client device simulated by the background traffic generator. Hence, the data client emulator can simulate individual movements of data client devices, as well as changing the number of devices associated with the access point.

The phone emulator (400) and data client emulator (402) can be employed to test operation of the access point (100) and communications protocols. One feature of the protocols developed to support voice communications on WLANs is control of Quality of Service ("QoS"). QoS can be controlled in-part by implementing admission control protocols to limit the number of simultaneous calls through a single AP, and priority protocols to process packets according to assigned levels of priority. For example, an admission control protocol may prevent admittance of a new voice or data client if there is insufficient bandwidth to support that new client. Similarly, in the case of packet forwarding and drop decisions preference may be given to voice packets because voice applications tend to be more susceptible to packet loss, delay and jitter. It will therefore be appreciated that the architecture is well suited to testing such protocols and the devices in which the protocols are implemented.

Referring now to FIGS. 3A through 3F, the test console (108) is operable to plot data such as voice quality versus number of calls, % frames loss versus number of calls, delay versus number of calls, jitter versus number of calls, and background traffic throughput versus number of calls. Such data may be useful when testing the ability of access points, switches and other WLAN infrastructure devices to forward and prioritize voice traffic in the presence of background data traffic. Important metrics for qualifying equipment include call capacity and call quality as a function of traffic congestion and number of active stations. To measure voice quality as a function of call capacity and background traffic, WiFi calls and low priority background traffic from multiple clients are generated through the DUT, e.g., access point (100). Further, to test an access point's ability to prioritize voice packets and to manage the number of active calls, the client emulators support WME and Admission Control. While sending traffic, forwarding rate, packet loss, delay and jitter on the voice packet streams going through the infrastructure under test are measured. Call capacity is measured by having the phone emulator (400) generate multiple voice calls at a high voice priority while the data client emulator (402) is generating background traffic from conventional PC clients.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for testing roaming of a wireless device between access points comprising:
   an enclosure for shielding the wireless device from electro-magnetic interference;
   a communications traffic generating device in communication with the wireless device, the traffic generating device operable to generate communications traffic;
   a plurality of access points, each in a communications path between the wireless device and the communications traffic generating device; and
   at least one dynamically adjustable attenuator operable to individually and adjustably attenuate signals between the wireless device and the traffic generating device via each communication path over time during a test,
   whereby roaming of the wireless device between access points can be tested by varying path loss between the wireless device and access points.

2. The apparatus of claim 1 further including, for each access point, a pair of dynamically adjustable attenuators connected in series with a tap connected therebetween, and a monitor connected to the tap.

3. The apparatus of claim 1 further including a device operable to measure at least one of: roaming time, quality of service, packet loss, delay and jitter.

4. The apparatus of claim 3 wherein the device provides data indicative of at least one of:
   roaming time, quality of service, packet loss, delay and jitter,
as a function of at least one of:
   call load, background load, distance, path loss, roam, and rate of simulated motion.

5. The apparatus of claim 1 wherein the dynamically adjustable attenuator is further operable to adjustably attenuate signals at variable rates over time, whereby changes in rate of motion of the wireless device are simulated.

6. The apparatus of claim 1 wherein the dynamically adjustable attenuator is further operable to adjustably increase and decrease signal strength over time, whereby changes in direction of motion of the wireless device are simulated.

7. The apparatus of claim 1 further including a device in communication with the dynamically adjustable attenuator, the device being operable to control operation of the attenuator in a predetermined manner.

8. A method for testing roaming of a wireless device between access points comprising the steps of:
   shielding the wireless device from electro-magnetic interference;
   generating communications traffic with a communications traffic generating device in communication with the wireless device;
   providing a plurality of communications paths between the wireless device and the communications traffic generating device, each path associated with an access point; and
   individually, dynamically, adjustably attenuating signals between the wireless device and the traffic generating device via each communication path over time during a test with at least one attenuator,
   whereby roaming of the wireless device between access points can be tested by varying path loss between the wireless device and access points.

9. The method of claim 8 further including, for each access point, a pair of dynamically adjustable attenuators connected in series with a tap connected therebetween, and including the further step of monitoring signals at the tap.

10. The method of claim 8 further including the step of measuring at least one of: roaming time, quality of service, packet loss, delay and jitter.

11. The method of claim 8 further including the step of providing data indicative of at least one of:
   roaming time, quality of service, packet loss, delay and jitter,
as a function of at least one of:
   call load, background load, distance, path loss, roam, and rate of simulated motion.

12. The method of claim 8 including the further step of adjustably attenuating signals at variable rates over time, whereby changes in rate of motion of the wireless device are simulated.

13. The method of claim 8 including the further step of adjustably increasing and decreasing signal strength over time, whereby changes in direction of motion of the wireless device are simulated.

14. The method of claim 8 further including a device in communication with the dynamically adjustable attenuator, the device being operable to control operation of the attenuator in a predetermined manner.

15. Apparatus for testing roaming of a wireless device associated with changing traffic conditions comprising:
   an enclosure for shielding the device from electro-magnetic interference;
   a communications traffic generating device in communication with the wireless device, the communications traffic generating device being operable to generate traffic in amounts which are variable over time during a test; and
   a plurality of access points, each in a communications path between the wireless device and the communications traffic generating device;
   whereby roaming of the wireless device between access points can be tested by varying traffic.

16. The apparatus of claim 15 further including at least one dynamically adjustable attenuator operable to individually and adjustably attenuate signals between the wireless device and the traffic generating device via each communication path over time during a test.

17. The apparatus of claim 15 wherein the traffic generating device includes a phone emulator which generates packets carrying voice traffic and a data client emulator which generates packets not carrying voice traffic, and being operable to generate communications traffic representative of a selected, variable number of voice traffic devices and data client devices.

18. The apparatus of claim 15 wherein the traffic generating device is operable to generate traffic of at least first and second types, where the first traffic type has a higher priority than the second traffic type, whereby prioritization support may be tested.

19. The apparatus of claim 18 wherein the higher priority traffic is increased during the test.

20. The apparatus of claim 18 wherein the lower priority traffic is increased during the test.

21. The apparatus of claim 15 further including a second real device in a separate shielded enclosure in communication with the wireless device.

22. The apparatus of claim 17 wherein the communications traffic generator is operable to increase the number of simulated phones during a test.

23. The apparatus of claim 17 wherein the communications traffic generator is operable to increase the number of simulated data clients during a test.

24. The apparatus of claim 15 further including a measurement device operable to measure at least one of: roaming time, quality of service, packet loss, delay and jitter.

25. The apparatus of claim 15 wherein a device provides data indicative of at least one of:
   roaming time, quality of service, packet loss, delay and jitter,
as a function of at least one of:
   call load, background load, distance, path loss, roam, and rate of simulated motion.

26. The apparatus of claim 15 further including at least one dynamically adjustable attenuator operable to individually and adjustably attenuate signals between the wireless device and the communications traffic generating device over time during a test.

27. The apparatus of claim 26 wherein the dynamically adjustable attenuator is further operable to adjustably attenuate signals at variable rates over time, whereby changes in rate of motion of the DUT are simulated.

28. The apparatus of claim 15 further including a pair of dynamically adjustable attenuators connected in series with a tap connected therebetween, and a monitor connected to the tap.

29. A method for testing roaming of a wireless device associated with changing traffic conditions comprising the steps of:
   shielding the wireless device from electro-magnetic interference;
   generating, with a communications traffic generating device in communication with the wireless device, traffic in amounts which are variable over time during a test; and
   monitoring communications between the wireless device and a plurality of access points, each in a communications path between the wireless device and the communications traffic generating device;
   whereby roaming of the wireless device between access points can be tested by varying traffic.

30. The method of claim 29 further including at least one dynamically adjustable attenuator operable to individually and adjustably attenuate signals between the wireless device and the traffic generating device via each communication path over time during a test.

31. The method of claim 29 wherein the traffic generating device includes a phone emulator which generates packets carrying voice traffic and a data client emulator which generates packets not carrying voice traffic, and being operable to generate communications traffic representative of a selected, variable number of voice traffic devices and data client devices.

32. The method of claim 29 including the further step of generating traffic of at least first and second types, where the first traffic type has a higher priority than the second traffic type whereby prioritization support may be tested.

33. The method of claim 32 including the further step of increasing the higher priority traffic is increased during the test.

34. The method of claim 32 including the further step of increasing the lower priority traffic during the test.

35. The method of claim 29 further including a second real device in a separate shielded enclosure in communication with the wireless device.

36. The method of claim 31 further including the step of increasing the number of simulated phones during a test.

37. The method of claim 31 further including the step of increasing the number of simulated data clients during a test.

38. The method of claim 29 including the further step of measuring at least one of:
   roaming time, quality of service, packet loss, delay and jitter.

39. The method of claim 38 including the further step of providing data indicative of at least one of:
   roaming time, quality of service, packet loss, delay and jitter,
as a function of at least one of:
   call load, background load, distance, path loss, roam, and rate of simulated motion.

40. The method of claim 29 further including at least one dynamically adjustable attenuator, and including the further step of individually and adjustably attenuating signals between the wireless device and the communications traffic generating device over time during a test.

41. The method of claim 40 including the further step of adjustably attenuating signals at variable rates over time, whereby changes in rate of motion of the wireless device are simulated.

42. The method of claim 40 including the further step of adjustably increasing and decreasing signal strength over time, whereby changes in direction of motion of the DUT are simulated.

43. The method of claim 29 further including a pair of dynamically adjustable attenuators connected in series with a tap connected therebetween, and including the further step of monitoring at the tap.

\* \* \* \* \*